United States Patent
Raines et al.

(10) Patent No.: US 9,440,613 B1
(45) Date of Patent: Sep. 13, 2016

(54) ACTIVE BOLSTER WITH DIRECTIONAL VENT INTO CONCEALED BUFFER ZONE

(71) Applicant: FORD GLOBAL TECHNOLOGIES, LLC, Dearborn, MI (US)

(72) Inventors: Stacey H. Raines, Ypsilanti, MI (US); Robert A. Chanko, South Lyon, MI (US); Nicholas A. Mazzocchi, Ann Arbor, MI (US); Kaitlin M. Cischke, Bloomfield Hills, MI (US); Tyler Cohoon, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/686,018

(22) Filed: Apr. 14, 2015

(51) Int. Cl.
| | |
|---|---|
| *B60R 21/04* | (2006.01) |
| *B60R 21/045* | (2006.01) |
| *B60R 21/206* | (2011.01) |
| *B60R 21/239* | (2006.01) |
| *B60R 21/261* | (2011.01) |
| *B60R 21/00* | (2006.01) |
| *B60R 21/231* | (2011.01) |

(52) U.S. Cl.
CPC ............. *B60R 21/261* (2013.01); *B60R 21/04* (2013.01); *B60R 21/045* (2013.01); *B60R 21/206* (2013.01); *B60R 21/239* (2013.01); *B60R 2021/0051* (2013.01); *B60R 2021/0407* (2013.01); *B60R 2021/23169* (2013.01)

(58) Field of Classification Search
CPC ... B60R 21/04; B60R 21/045; B60R 21/206; B60R 21/239; B60R 21/261; B60R 2021/0051; B60R 2021/0407; B60R 2021/23169
See application file for complete search history.

(56) References Cited

U.S. PATENT DOCUMENTS

| | | | |
|---|---|---|---|
| 8,328,233 | B2 | 12/2012 | Kalisz |
| 8,454,054 | B1 | 6/2013 | Raines |
| 8,459,689 | B2 | 6/2013 | Roychoudhury |
| 8,491,008 | B2 | 7/2013 | Roychoudhury et al. |
| 8,720,943 | B1 | 5/2014 | Mazzocchi et al. |
| 8,931,803 | B2 | 1/2015 | Roychoudhury |
| 9,156,423 | B1 * | 10/2015 | Aselage ................. B60R 21/239 |
| 9,260,075 | B2 * | 2/2016 | Young ................... B60R 21/276 |

* cited by examiner

*Primary Examiner* — Laura Freedman
(74) *Attorney, Agent, or Firm* — Vichit Chea; MacMillan, Sobanski & Todd, LLC

(57) ABSTRACT

An active bolster includes a plastic trim wall that deploys toward a passenger compartment and a plastic-molded bladder member joined with the trim wall by a hot weld seam to form an inflatable bladder. The bladder member includes at least one substantially circumferential pleat for unfolding in response to an inflation gas. A reaction member is joined to a central region of the bladder member to provide a reaction surface. The pleat has a peak disposed proximate to the reaction member and an outer band between the peak and the weld seam at least a portion of which extends perpendicularly to the reaction member. A buffer zone is formed circumjacent the outer band between the trim wall and the reaction member. The pleat has a vent opening formed in the outer band providing an unobstructed path for inflation gas from the inflatable bladder to the buffer zone.

5 Claims, 7 Drawing Sheets

ACTIVE BOLSTER WITH DIRECTIONAL VENT INTO CONCEALED BUFFER ZONE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster with an inflatable bladder formed by plastic wall panels that are hot welded to form a hermetic seal wherein one wall is vented for a controlled release of inflation gas.

An active bolster is a vehicle occupant protection device with a gas-inflatable bladder to absorb impacts and reduce trauma to occupants during a crash. As opposed to deployable air bag cushions made of various fabrics that emerge from behind various openings upon inflation, active bolsters use the interior trim surface (e.g., instrument panel dashboard, glove box, passenger door, or seat back) itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes a front wall or trim panel that faces a vehicle occupant and is attached to a back wall or bladder member along a sealed periphery. One or both of the walls is deformable in order to provide an expandable, inflatable bladder. For example, the bladder member may have a pleated (i.e., accordion-like) region that straightens out during inflation.

The front and back walls of a typical bladder for an active bolster are comprised of molded thermoplastics such as polyethylene, polyolefin, or PVC. They are typically injection molded but can also be blow molded. When formed separately, the front and back walls must be hermetically joined around their periphery in order to form the inflatable bladder. The joint must be strong to resist separation that could result from high inflation pressures during inflation and that result when a passenger impacts the bolster. The peripheral seal is formed by hot welding, for example.

It is known that in order to optimize the dissipation of energy when an occupant contacts an air bag or an active bolster, inflation gas should be vented to allow a controlled collapse of the airbag that safely decelerates the impacting occupant. U.S. Pat. No. 8,720,943, issued May 13, 2014, which is incorporated herein by reference, discloses an active vent structure for providing a variable vent flow rate.

Various types of structures and locations on a pleated bladder member have been disclosed for venting inflation gas during inflation and during loading by an impacting passenger. Venting locations have been disclosed on the central, flat areas of the bladder wall, in the pleated baffle region of the bladder wall, and in welding towers that attach the bladder wall to a reaction surface, for example. It has been suggested that vents can be placed 1) in close proximity to local regions where the stresses of inflation forces may create a highest probability of weld failure, or 2) with a spatial distribution that adjusts the restraint forces provided at different regions of the bolster. Since it is desirable to locate the vent(s) close to the hot weld seam, the outermost pleat is often selected for the vent locations. With injection molding of the bladder member, the window openings for vents on the outermost pleat have been located at the top (i.e., peak) of the pleat since that facilitates the injection molding process and simplifies the molding tools. However, it has been discovered that in some circumstances the resulting gas flow has not provided the intended decrease in weld stress during the initial stages of inflation.

SUMMARY OF THE INVENTION

In one aspect of the invention, an active bolster is mounted at an interior trim surface of a passenger compartment in an automotive vehicle. A plastic-molded front trim wall deploys in a deployment direction toward a passenger in the passenger compartment. A plastic-molded bladder member is joined along an outer perimeter with the front wall by a hot weld seam to form an inflatable bladder. The bladder member includes at least one substantially circumferential pleat adjacent the hot weld seam for unfolding in response to an inflation gas injected into the inflatable bladder. A reaction member is joined to a central region of the bladder member to provide a reaction surface for expansion of the bladder member. The pleat has a peak disposed proximate to the reaction member and has an outer band between the peak and the hot weld seam at least a portion of which extends perpendicularly to the reaction member. A buffer zone is formed circumjacent the outer band between the front trim wall and the reaction member. The pleat has a vent opening at least partially formed in the outer band providing an unobstructed path for inflation gas from the inflatable bladder to the buffer zone.

DETAILED DESCRIPTION OF PREFERRED EMBODIMENTS

Figure 1:
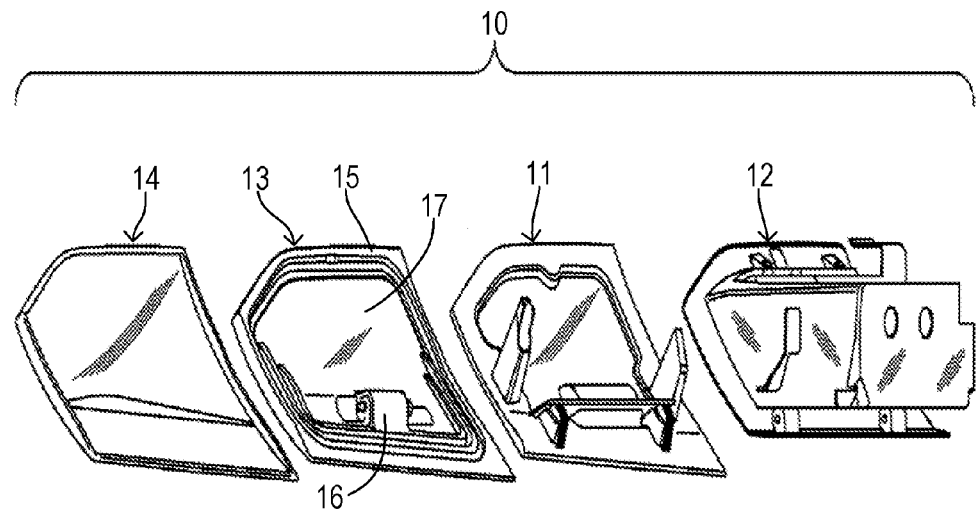
FIG. 1 is an outward-looking, exploded perspective view of an active knee bolster glove box door system of a type to which the present invention can be applied.

Referring now to FIG. 1, a prior art active knee bolster system 10 has a base panel component 11 which forms the foundation for the bolster. Base 11 may be either attached to the vehicle by hinging from a storage cavity or glove box 12 as shown in FIG. 1, or mounted to another structure such as an instrument panel support located below a steering column, for example. Such locations are accessible to the knees of an individual passenger riding in a corresponding seating position within a vehicle.

In this arrangement, base 11 is a door inner wall or liner that acts as a reaction surface for supporting an inflatable bladder formed by a back (bladder) wall 13 and a front (trim) wall 14 that are joined around their periphery 15. Walls 13 and 14 are preferably comprised of molded plastics (such as thermoplastic polyolefin (TPO)) and are joined by plastic hot welding, such as hot plate or vibration welding, to form a peripheral seal around a central region 17 for forming an inflatable bladder. An inflation gas source 16 is electronically controlled for activating during a crash to release gas to inflate the bolster. Front wall 14 may comprise the Class A interior trim surface such as the outside of the glove box door, or an additional skin or cover (not shown) can be applied to its outer surface.

Figure 2:
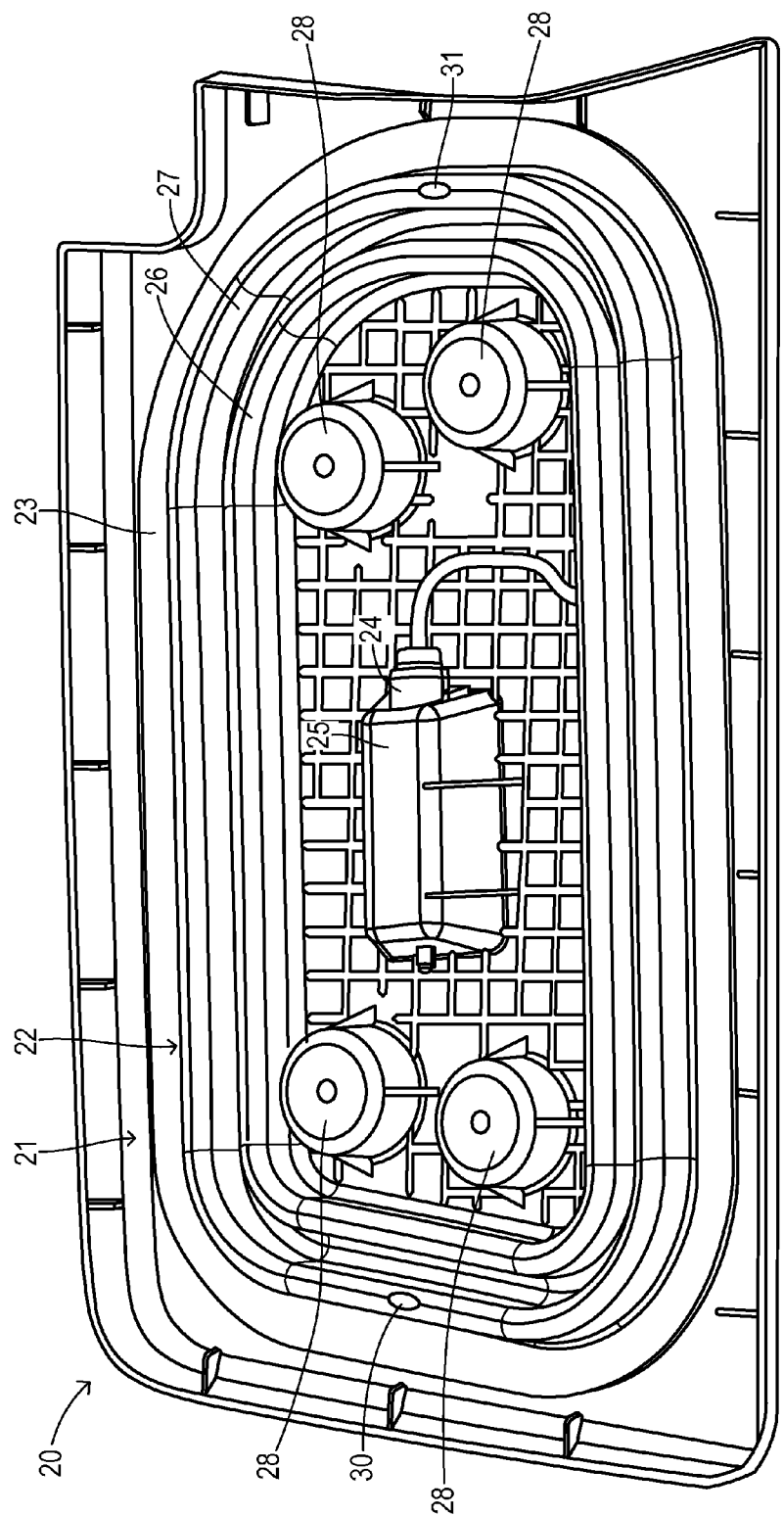
FIG. 2 is a rear perspective view of an inflatable bladder assembly of an active bolster.

FIG. 2 is a rear view of an inflatable bladder 20 for an active bolster. A plastic-molded front wall or trim panel 21 overlies a plastic-molded, expandable back wall or bladder member 22. Wall 21 and bladder member 22 are joined around a closed perimeter region by hot welding a flange 23 to an inside surface of trim wall 21 in order to form an inflatable bladder having an open central volume between wall 21 and bladder member 22 to receive an inflation gas from an inflator 24 mounted in a recess 25 of bladder member 22 during a crash event. Bladder member 22 includes a plurality of pleats, such as 26 and 27, to accommodate the expansion of bladder member 22 during inflation. Pleat 27 is an outermost pleat which is adjacent to welding flange 23. A plurality of attachment towers (i.e., bosses) 28 project from a central region of bladder member 22 disposed within baffle pleats 26 and 27. Towers 28 are used to mount bladder member 22 to a reaction surface (not shown). A pair of vent holes 30 and 31 penetrate through bladder member 22 at a peak of outermost pleat 27.

Figure 3:
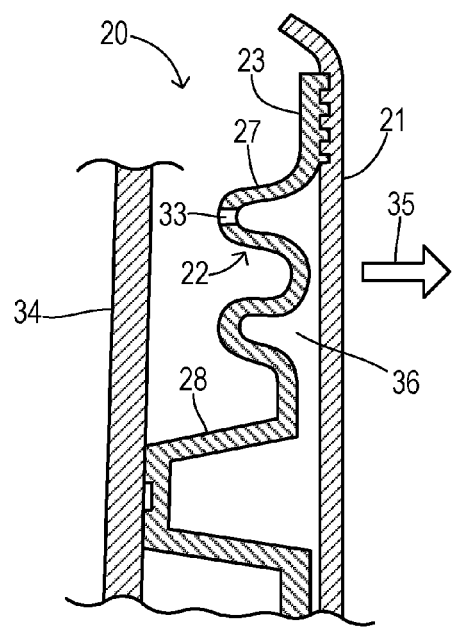
FIG. 3 is a side cross section showing a prior art active bolster assembly.

FIG. 3 shows a cross-section of bladder 20 as assembled onto a reaction wall 34. Attachment tower 28 may be hot welded to reaction wall 34, for example. Baffle pleat 27 is penetrated by a window opening 33 to provide a vent. During deployment as a result of an inflation gas being supplied into a bladder cavity 36, front trim wall 21 deploys in a deployment direction 35 toward a passenger in the passenger compartment of a vehicle.

Figure 4:
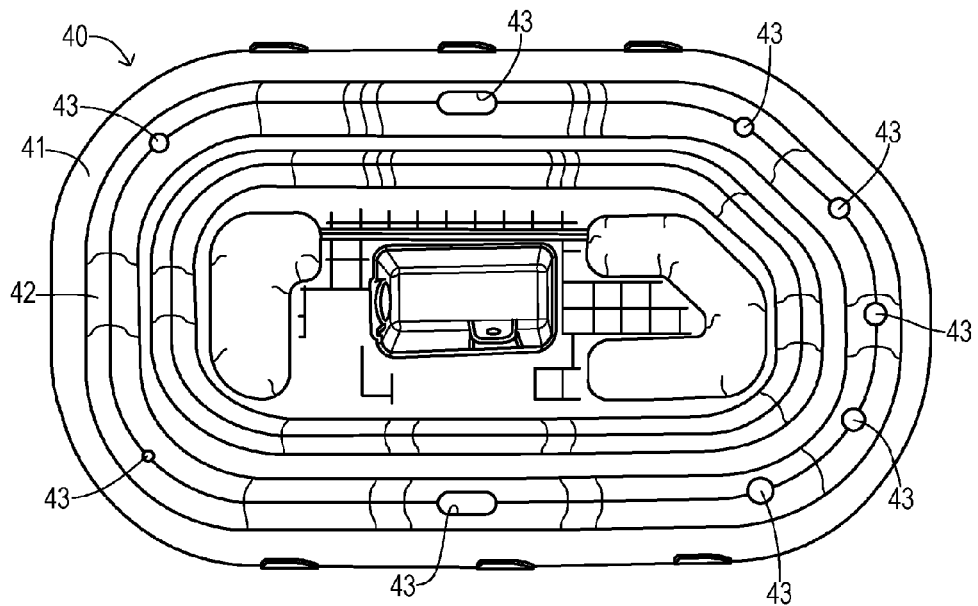
FIG. 4 is a rear, plan view of a bladder member with a plurality of vent openings distributed around an outermost pleat.

FIG. 4 shows another embodiment of a bladder member 40 with a peripheral welding flange 41 along a circumferential edge of bladder member 40. A pleated baffle includes a pleat 42 circumferentially disposed within welding flange 41 which unfolds during bolster deployment. A plurality of vent openings 43 are formed in pleat 42 since close proximity to the hot weld seam provides a better ability to reduce stress on the weld.

Figure 5:
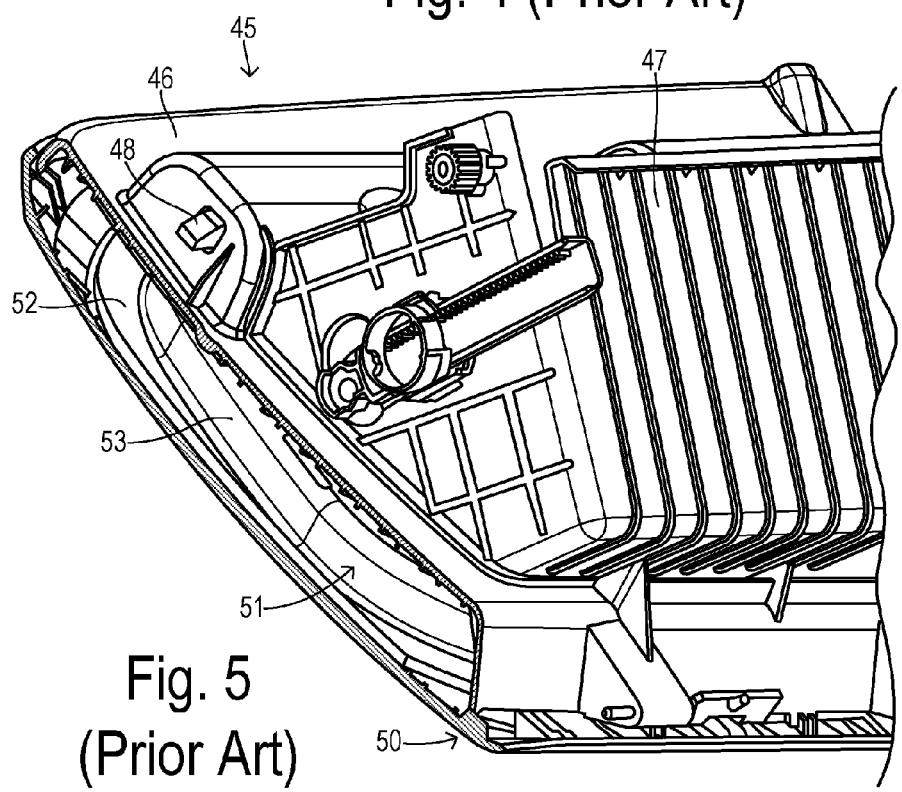
FIG. 5 is a rear perspective view of an active glove box assembly with an edge partially broken away.

FIG. 5 shows an active glove box assembly 45 including a door inner liner wall 46 providing a reaction surface for an inflatable bolster and which supports a storage bin 47 and a latch 48. A front trim wall 50 is attached to a bladder member 51 along a welding flange 52. An outermost pleat 53 is disposed adjacent to flange 52. A central region (not shown) of bladder member 51 is attached to door inner wall/reaction surface 46.

Figure 6:
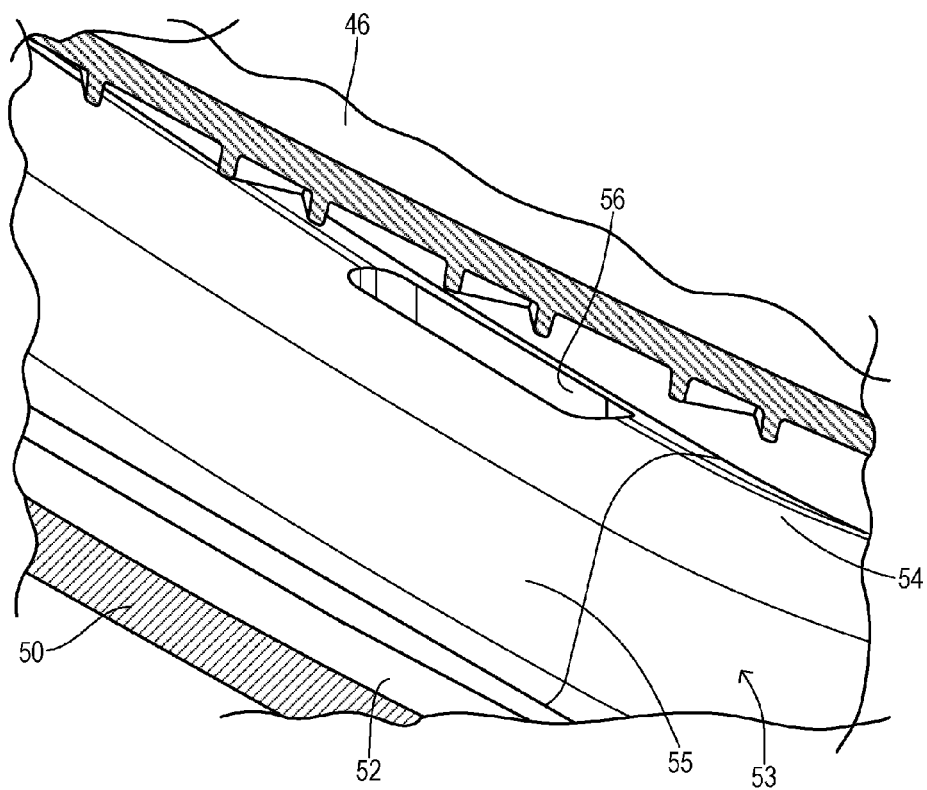
FIG. 6 is an enlargement of a portion of FIG. 5 including a vent opening.
Figure 7:
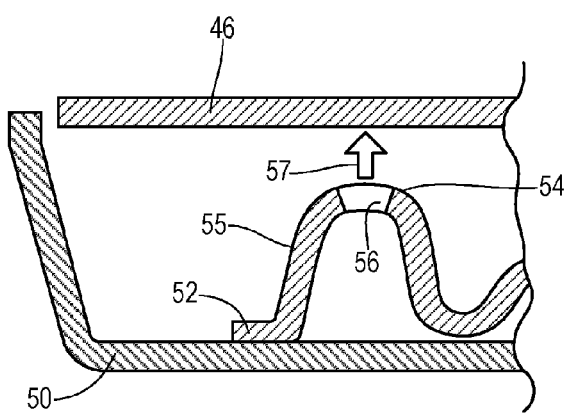
FIG. 7 is a cross section showing an interface of a prior art vent opening with a reaction surface.

As shown in FIG. 6, outermost pleat 53 includes a peak 54 that closely approaches reaction wall 46. An outer band 55 of pleat 53 extends between peak 54 and welding flange 52 such that at least a portion of outer band 55 is oriented substantially perpendicular to reaction wall 46, i.e., facing the sides of the bolster along a radially outward direction of bladder member 51. Within peak 54, pleat 53 includes a prior art vent opening 56. As shown in FIG. 7, a flow path 57 for inflation gas being exhausted through vent opening 56 is partially obstructed by the close proximity of reaction wall 46. Consequently, excessive inflation gas pressure can build up along the weld seam that joins flange 52 to trim wall 50 because of the reduction in the effective flow rate through vent opening 56. Increasing the size of vent opening 56 raise the initial flow rate and to reduce the initial stress from pressure buildup may be undesirable because it would result in too high of a flow rate after pleat 53 begins to unfold and reaction wall 46 ceases to provide an obstruction.

Figure 8:
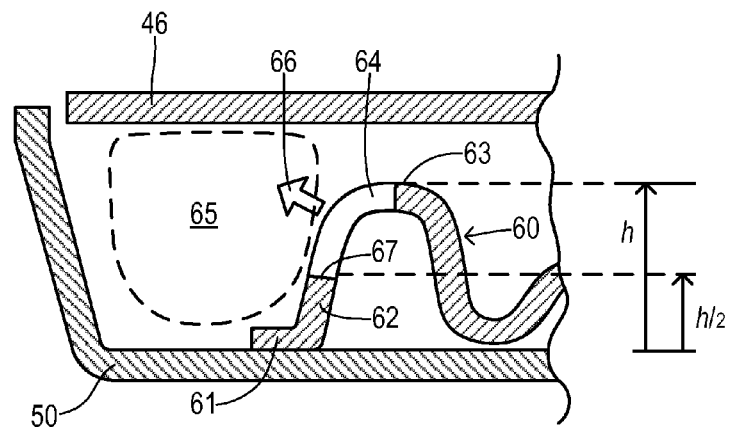
FIG. 8 is a cross section showing a modified vent opening of the present invention.

As shown in FIG. 8, the present invention takes advantage of a buffer zone typically present in an active bolster assembly such as an active glove box door. Thus, a bladder member 60 is hot welded to trim panel 50 along a weld flange 61. Bladder member 60 has an outermost pleat with an outer band 62 facing a buffer zone 65 and a peak 63 facing reaction wall 46. Buffer zone 65 between trim panel 50 and reaction wall surface 46 defines a space having a volume larger than the volume within the outermost pleat, and may continue toroidally around the full circumference of the outermost pleat. A vent opening 64 in the outermost pleat is at least partially formed in outer band 62 between peak 63 and welding flange 61. Vent opening 64 has a lower edge 67 proximal to flange 61 and within outer band 62. An exhaust path 66 from the inside of bladder member 60 through vent opening 64 directly into buffer zone 65 becomes available to the inflation gas. Since there is less flow resistance to the side of bladder member 60 into buffer zone 65, the majority of the initial gas flow (i.e., before unfolding of the pleats and movement of trim panel 50 away from reaction wall 46) is to the side. A portion of vent opening 64 may still be formed in peak 63 (e.g., for ease of molding). Peak 63 extends from trim panel 50 by a height h. Proximal edge 67 is closer to trim panel 50, preferably at a height less than about two-thirds h, and most preferably about one-half h.

Figure 9:
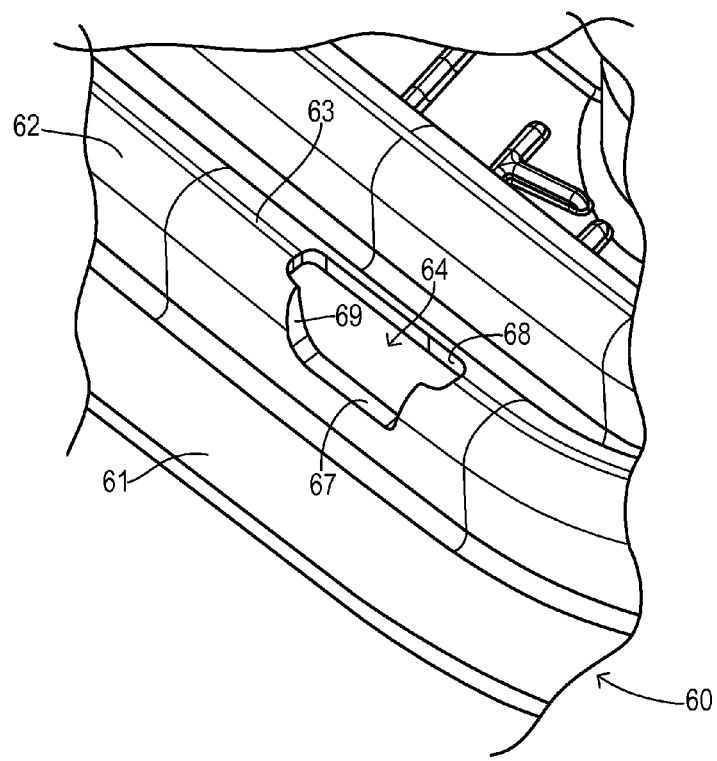
FIG. 9 is a perspective view of a vent opening in a bladder member according to one embodiment.

FIG. 9 is a perspective view showing vent opening 64 with an upper section 68 formed in peak 63 and a lower section 69 in outer band 62. FIG. 9 depicts a modification to an existing bladder design with vent openings in the peaks. Lower section 69 has a side-to-side width chosen to provide a desired flow coefficient in the direction of the buffer zone. Thus, lower section 69 may have a different width than upper section 68. A sideways flow path through lower section 69 may dominate during the initial stages of inflation since it is relatively unobstructed. Thus, stresses on the hot weld seam formed by flange 61 are reduced as desired.

Figure 10:
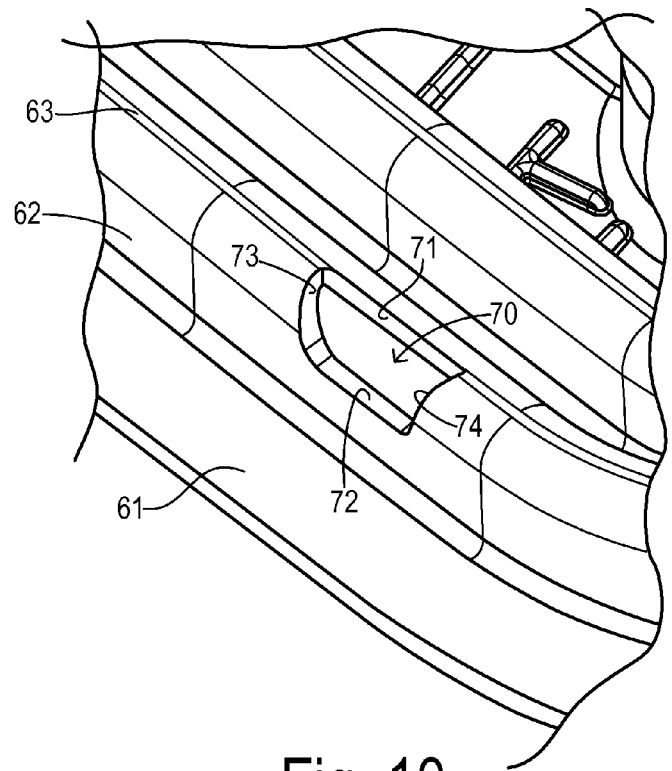
FIG. 10 is a perspective view of a vent opening in a bladder member according to another embodiment.
Figure 11:
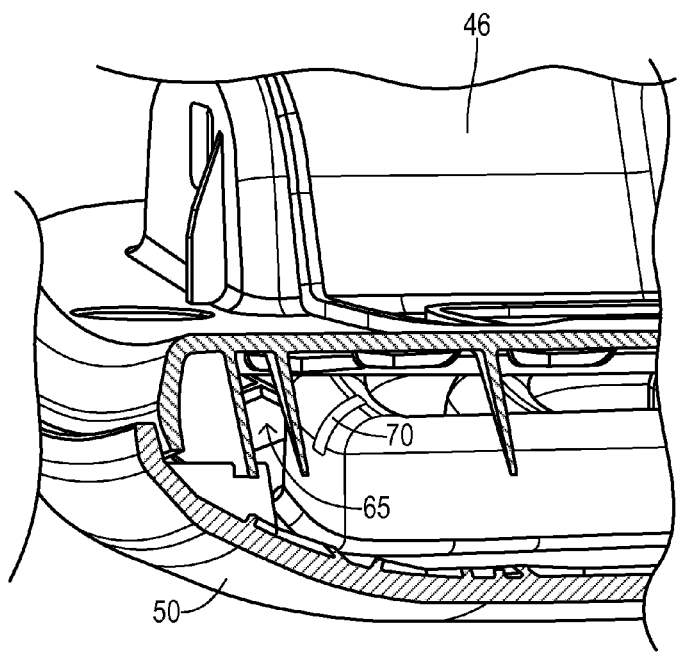
FIG. 11 is a partially broken-away side view of an active bolster assembly of the present invention.

FIG. 10 shows an alternative embodiment for a vent opening 70 with a distal edge 71, proximal edge 72, and inside edges 73 and 74, resulting in a opening with a uniform width. Proximal edge 72 is located in outer band 62 to provide an unobstructed path for inflation gas into the buffer zone circumjacent outer band 62. FIG. 11 shows the spatial relationship between trim panel 50, reaction wall 46, and vent opening 70 which creates buffer zone 65.

Figure 12:
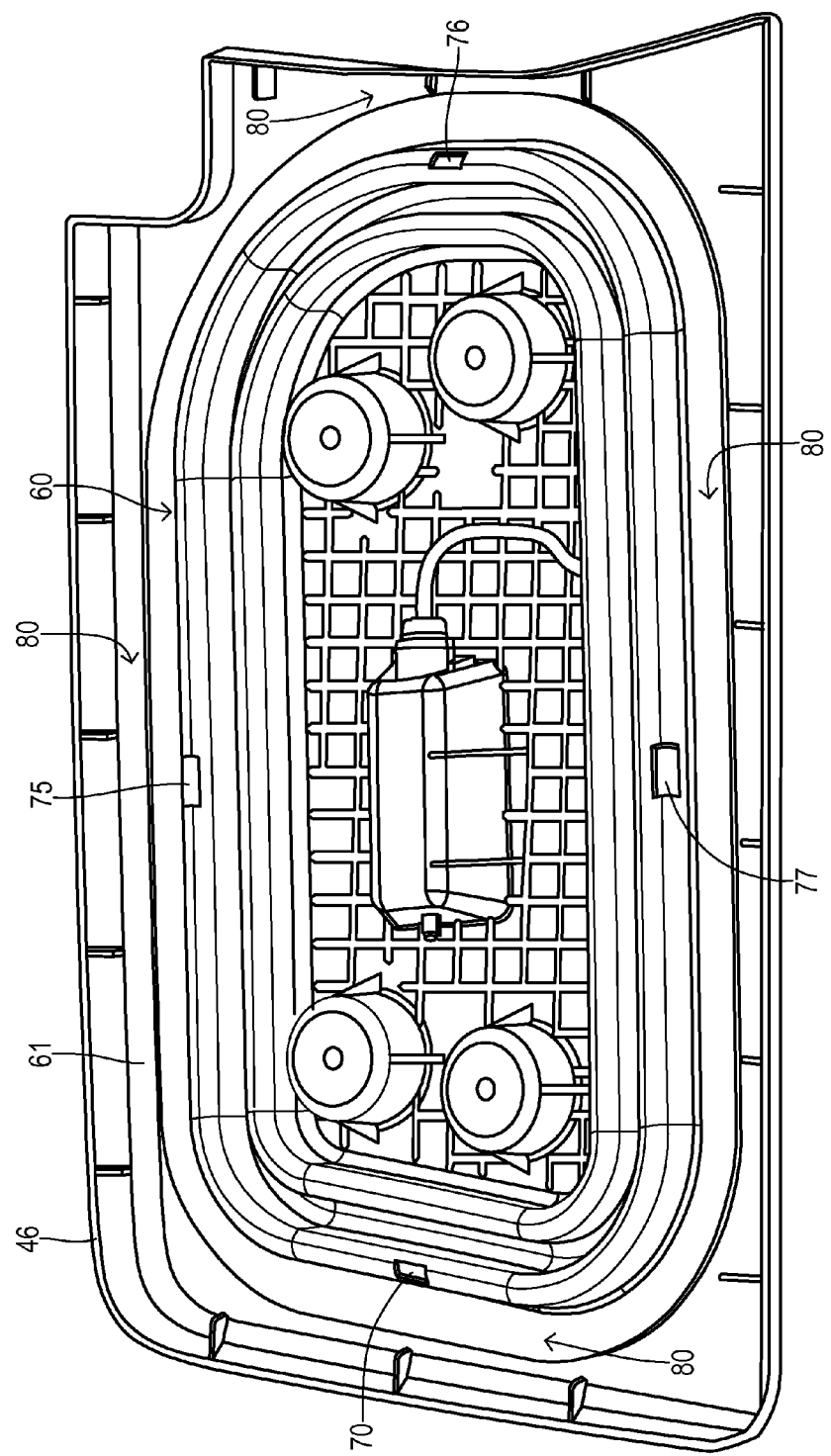
FIG. 12 is a rear, perspective view of a bladder member and trim panel according to another embodiment of the invention.

FIG. 12 shows a further embodiment wherein bladder member 60 includes a plurality of vent openings 70, 75, 76, and 77 formed in the outermost pleat with at least a portion of each vent opening partially formed in the outer band of the outermost pleat. This provides an unobstructed path for inflation gas from within bladder member 60 into a buffer zone 80. Buffer zone 80 extends on all sides of bladder member 60 due to the cupped-shape of reaction wall 46.

By reducing the flow resistance through the vent opening(s), the invention improves overall weld performance. In addition, it lessens the sensitivity of the exhaust flow to the changing orientation of the vent openings to the reaction wall during the progressive unfolding of the bladder member.

What is claimed is:

1. An active bolster for mounting at an interior trim surface of a passenger compartment in an automotive vehicle, comprising:
   a plastic-molded front trim wall for deploying toward a passenger in the passenger compartment;
   a plastic-molded bladder member joined along an outer perimeter with the trim wall by a hot weld seam to form an inflatable bladder, wherein the bladder member includes at least one substantially circumferential pleat adjacent the weld seam for unfolding in response to an inflation gas injected into the inflatable bladder; and
   a reaction member joined to a central region of the bladder member to provide a reaction surface for expansion of the bladder member;
   wherein the pleat has a peak disposed proximate to the reaction member and has an outer band between the peak and the hot weld seam at least a portion of which extends perpendicularly to the reaction member, wherein a buffer zone is formed circumjacent the outer band between the trim wall and the reaction member, and wherein the pleat has a vent opening at least partially formed in the outer band providing an unobstructed path for inflation gas from the inflatable bladder to the buffer zone.

2. The active bolster of claim 1 wherein the vent opening is formed in the outer band and the peak.

3. The active bolster of claim 1 wherein the peak has a predetermined height from the front trim wall, and wherein the vent opening has a proximal edge at a predetermined distance from the front trim wall less than two-thirds of the predetermined height.

4. The active bolster of claim 3 wherein the predetermined distance is about one-half of the predetermined height.

5. The active bolster of claim 1 wherein the pleat has a plurality of vent openings, each vent opening at least partially formed in the outer band and providing a respective unobstructed path for inflation gas from the inflatable bladder to the buffer zone.

* * * * *